US006760580B2

(12) United States Patent
Robinson et al.

(10) Patent No.: US 6,760,580 B2
(45) Date of Patent: Jul. 6, 2004

(54) FACILITATING INSTANT MESSAGING OUTSIDE OF USER-DEFINED BUDDY GROUP IN A WIRELESS AND NON-WIRELESS ENVIRONMENT

(75) Inventors: B. Alex Robinson, Maple Valley, WA (US); Charles A. Carey, Kirkland, WA (US); Michael Longe, Seattle, WA (US); Joe Parr, Redmond, WA (US)

(73) Assignee: America Online, Incorporated, Dulles, VA (US)

( * ) Notice: Subject to any disclaimer, the term of this patent is extended or adjusted under 35 U.S.C. 154(b) by 190 days.

(21) Appl. No.: 10/114,869

(22) Filed: Apr. 1, 2002

(65) Prior Publication Data

US 2002/0155826 A1 Oct. 24, 2002

Related U.S. Application Data

(63) Continuation-in-part of application No. 09/519,525, filed on Mar. 6, 2000.

(51) Int. Cl.[7] ................................................. H04Q 7/20
(52) U.S. Cl. .................... 455/412.2; 455/445; 455/466; 709/207; 709/204
(58) Field of Search .............................. 455/412.2, 445, 455/466; 709/206, 228, 238, 204, 207; 345/758; 379/88.08, 88.12, 88.22; 713/153, 162

(56) References Cited

U.S. PATENT DOCUMENTS

| 5,351,235 A | 9/1994 | Lahtinen .................... 370/58.1 |
| 5,436,960 A | 7/1995 | Campana, Jr. et al. ........ 379/58 |
| 5,438,611 A | 8/1995 | Campana, Jr. et al. ........ 379/58 |

(List continued on next page.)

FOREIGN PATENT DOCUMENTS

| EP | 1 071 295 A2 | 1/2001 | ....................... 7/22 |
| EP | 1 104 961 A1 | 6/2001 | .................... 12/58 |
| EP | 1 104 965 A1 | 6/2001 | .................... 12/58 |
| EP | 1 113 619 A2 | 7/2001 | .................... 12/28 |
| EP | 1 113620 A1 | 7/2001 | .................... 12/28 |
| EP | 1 113 631 A2 | 7/2001 | .................... 12/58 |
| EP | 1 113 640 A2 | 7/2001 | ....................... 29/6 |
| EP | 1 113 659 A2 | 7/2001 | |
| EP | 1 113 677 A2 | 7/2001 | |
| EP | 1 011 243 B1 | 10/2001 | ....................... 29/6 |
| EP | 1 091 532 A2 | 11/2001 | .................... 12/66 |
| WO | 00/43892 | 7/2000 | |
| WO | 01/41477 | 6/2001 | ....................... 7/24 |

OTHER PUBLICATIONS www.yahoo.com, Yahoo! Messenger for Text Messaging, 2002.
Jabber, Inc., Jabber Wireless Gateway Overview, 2001.

(List continued on next page.)

*Primary Examiner*—Nay Maung
*Assistant Examiner*—Tilahun Gesesse
(74) *Attorney, Agent, or Firm*—Glenn Patent Group; Michael A. Glenn

(57) ABSTRACT

A method, system and computer program product for instant message communication in a wireless and non-wireless environment. The invented system includes an apparatus that facilitates conversation with individuals not included in the user's buddy group, non-buddies. The system includes at least one additional routing code reserved for conversing with non-buddies. The first time during a user session that the system receives a message originating from or destined for a non-buddy, before routing the message, the non-buddy's personal identifier is associated with one of the reserved routing codes. The mobile user can then reply to the message using the same automated 'reply' function available for replies to buddies. The non-buddy routing code assignment is only for the duration of a user session. When the mobile user signs off from the system, the routing code becomes available for reassignment.

24 Claims, 12 Drawing Sheets

U.S. PATENT DOCUMENTS

| | | | | |
|---|---|---|---|---|
| 5,479,472 | A | 12/1995 | Campana, Jr. et al. | 379/58 |
| 5,487,100 | A | 1/1996 | Kane | 379/57 |
| 5,557,320 | A | 9/1996 | Krebs | 348/12 |
| 5,561,703 | A | 10/1996 | Arledge et al. | 379/57 |
| 5,568,536 | A | 10/1996 | Tiller et al. | 379/58 |
| 5,579,472 | A | 11/1996 | Keyworth, II et al. | 395/326 |
| 5,590,133 | A | 12/1996 | Billstrom et al. | 370/349 |
| 5,604,788 | A | 2/1997 | Tett | 379/58 |
| 5,608,786 | A | 3/1997 | Gordon | 379/100 |
| 5,625,670 | A | 4/1997 | Campnan, Jr. et al. | 379/58 |
| 5,631,946 | A | 5/1997 | Campana, Jr. et al. | 379/58 |
| 5,706,211 | A | 1/1998 | Beletic et al. | 364/514 |
| 5,726,984 | A | 3/1998 | Kubler et al. | 370/349 |
| 5,742,668 | A | 4/1998 | Pepe et al. | 379/58 |
| 5,793,762 | A | 8/1998 | Penners et al. | 370/389 |
| 5,796,394 | A | 8/1998 | Wicks et al. | 345/329 |
| 5,812,865 | A | 9/1998 | Theimer et al. | 395/800 |
| 5,970,122 | A | 10/1999 | LaPorta et al. | 379/67.1 |
| 6,014,429 | A | 1/2000 | LaPorta et al. | 379/88.15 |
| 6,134,432 | A | 10/2000 | Holmes et al. | 455/412 |
| 6,169,911 | B1 | 1/2001 | Wagner et al. | 455/566 |
| 6,192,396 | B1 | 2/2001 | Kohler | 709/206 |
| 6,252,952 | B1 | 6/2001 | Kung et al. | 379/114 |
| 6,256,516 | B1 | 7/2001 | Wagner et al. | 455/565 |
| 6,259,911 | B1 | 7/2001 | Bims et al. | 455/423 |
| 6,282,435 | B1 | 8/2001 | Wagner et al. | 455/566 |
| 6,301,609 | B1 * | 10/2001 | Aravamudan et al. | 709/207 |
| 6,430,604 | B1 * | 8/2002 | Ogle et al. | 709/207 |
| 2001/0003202 | A1 | 6/2001 | Mache et al. | 713/153 |
| 2002/0006803 | A1 | 1/2002 | Mendiola et al. | 455/466 |
| 2002/0007398 | A1 | 1/2002 | Mendiola et al. | 709/206 |

OTHER PUBLICATIONS

Web sights– Talk is chap, text is cheaper (IEEE Spectrum May 2003).*

Instant Messaging with Mobile Phones to Support Awareness (Madoka Mitsuoka et al )Aug. 2001).*

Parvianen et al Mobile Instant Messaging (Jul. 3, 2003 IEEE).*

Phillips Business Information corporation –Aug. 23, 1999__ Instant messaging has emerged as one of the most popular communication mediums in the world.*

Patrice Godefroid, james D. Herbsleb, Lalita Jategaonkar Jagadeesan, and Du Li; *Ensuring Privacy in Presence Awareness Systems: An Automated Verification Approach.*

Richard S. Hall; *The Event Desktop: Supporting Event-enabled Clients on the Web*; Freie University, Berlin.

Luis Felipe Cabrera, Michael B. Jones, and Marvin Theimer; *Herald: Achieving a Global Event Notification Service*; Microsoft Research.

S. Okuyana, J. Kakuta, and A. Iwakawa; *New Mobile Service Based on Instant Messaging Technology*: Fujitsu; 2001; INSPEC p. 1.

A.C.M. Fong, S.C. Hui, and C.T. Lau; *Towards an Open Protocol for Secure Online Presence Notification*; Computer Standards & Interfaces; Sep. 2001; INSPEC page 2.

A.E. Milewski, and T.M. Smith; *Providing Presence Cues to Telephone Users*; Proceedings of CSCW 2000. ACM Conference on Computer Supported Cooperative Work; 2000; INSPEC p. 3 G. Held; *Instant Messaging Finds its Voice*; Network Magazine; May 2001; INSPEC p. 5.

S. Oritz, Jr.; *Instant Messaging: No Longer Just Chat*; Computer; Mar. 2001; INSPEC p. 6.

B. Raman, R.H. Katz, and A.D. Joseph; *Universal Inbox: Providing Extensible Personal Mobility and Service Mobility in an Integrated Communication Network*; Proceedings Third IEEE Workshop on Mobile Computing Systems and Applications; 2000; INSPEC p. 7.

V. Vittore; *The Next Dial Tone? [instant messaging]*; Telephony; Oct. 16, 2000; INSPEC p. 8.

M. Meola, and S. Stormont; *Real–Time Reference Service for the Remote User: From the Telephone and Electronic Mail to Internet chat, Instant Messaging, and Collaborative Software*; Reference Librarian; 1999; INSPEC p. 8.

A. Dornan; *Instant Gratification [instant messaging]*; Network Magazine; Aug. 2000; INSPEC p. 9.

M. Castelluccio; *e–mail in Real Time*; Strategic Finance; Sep. 1999; INSPEC p. 10.

H. S chulzrinne, and J. Rosenberg; *The IETF Internet Telephony Architecture and Protocols*; IEEE Network; May-Jun. 1999; INSPEC p. 11.

Bonnie A. Nardi, Steve Whittaker, and Erin Bradner; *Interaction and Outeraction: Instant Messaging in Action*; 2000.

R. Droms; *Dynamic Host Configuration Porotocol*; Network Working Group; Oct. 1993.

Jonathan B. Postel; *simple Mail Transfer Protocol*; RFC788; Information Sciences Institute; Nov. 1981.

Mark Handel, and Graham Wills; *TeamPortal: Providing Team Awareness on the Web*.

* cited by examiner

| COMMAND | COMMANDS | | PHONEBOOK ENTRIES: | |
|---|---|---|---|---|
| YOUR | FUNCTION | | NAME | NUMBER |
| SIGNON | SIGN IN TO THE AIM SYSTEM. | | AIM-SIGNON | 4646 |
| SIGNOFF | SIGN OFF THE AIM SYSTEM. | | AIM-SIGNOFF | 4647 |
| ADD BUDDY | ADD A BUDDY TO THE MOBILE DEVICE GROUP. | | AIM-ADD | 4648 |
| DELETE BUDDY | DELETE A BUDDY FROM THE MOBILE DEVICE GROUP. | | AIM-DELETE | 4649 |
| STATUS | DISPLAY BUDDIES AND THEIR STATUS. | | AIM-STATUS | 4650 |
| SET ALERT | ALERT YOU WHEN A SELECTED BUDDY SIGNS ON. | | AIM-SETALERT | 6451 |
| DECLINE | REJECT FURTHER MESSAGES FROM A SCREEN NAME. | | AIM-DECLINE | 4652 |
| SETTINGS | DISPLAYS THE NAMES AND NUMBERS OF THE COMMAND ENTRIES REQUIRED IN THE PHONEBOOK. KEEP THE LIST FOR REFERENCE. | | AIM-SETTINGS | 4653 |
| SEND UNLISTED | SEND A MESSAGE TO A SCREEN NAME NOT IN THE STATUS LIST | | AIM-UNLISTED | 4654 |
| SYSTEM | THIS COMMAND IS USED BY THE SYSTEM ONLY. | | AIM-MOBILE | 4655 |
| TEMP 1 | FOR A SCREEN NAME NOT INCLUDED IN YOUR STATUS LIST. | | AIM-TEMP1 | 4641 |
| TEMP 2 | FOR A SCREEN NAME NOT INCLUDED IN YOUR STATUS LIST. | | AIM-TEMP2 | 4642 |
| TEMP 3 | FOR A SCREEN NAME NOT INCLUDED IN YOUR STATUS LIST. | | AIM-TEMP3 | 4643 |
| TEMP 4 | FOR A SCREEN NAME NOT INCLUDED IN YOUR STATUS LIST. | | AIM-TEMP4 | 4644 |
| TEMP 5 | FOR A SCREEN NAME NOT INCLUDED IN YOUR STATUS LIST. | | AIM-TEMP5 | 4645 |

*FIG. 10A*

| YOUR BUDDY NAMES | PHONEBOOK ENTRIES | |
|---|---|---|
| BUDDY NAME | NAME | NUMBER |
| JUNABLIN | I JUNABLIN | 4601 |
| SHINNUN | I SHINNUN | 4602 |
| TAGICUNG | I TAGICUNG | 4603 |
| IWISHI300 | I IWISHI300 | 4604 |
| LOVEPADDLE | I LOVEPADDLE | 4605 |
| W E L L STAN | I W E L L STAN | 4606 |
| JUANEBRAVO2 | I JUANEBRAVO2 | 4607 |
| GRIND30 | I GRIND30 | 4608 |
| AUNTJEAN | I AUNTJEAN | 4609 |
| AKACRAZY8S | I AKACRAZY8S | 4610 |
| ADFLINCH | I ADFLINCH | 4611 |
| DUKARK | I DUKARK | 4612 |
| RIB2VINCA | I RIB2VINCA | 4613 |
| SMIHAR | I SMIHAR | 4614 |
| WIRALASSADF | I WIRALASSADF | 4615 |
| INSTINTIN1 | I INSTINTIN1 | 4616 |
| PIMMBILA | I PIMMBILA | 4517 |
| JIMRALL32 | I JIMRALL32 | 4618 |
| MICHCI13 | I MICHCI13 | 4621 |
| IWANABE | I IWANABE | 4622 |
| THUMP209 | I THUMP209 | 4623 |
| JINAMUNTARA | I JINAMUNTARA | 4624 |
| JBLIN | I JBLIN | 4625 |
| STEELWALLS | I STEELWALLS | 4627 |
| ITSGUSGUTS01 | I ITSGUSGUTS01 | 4628 |
| HDUGLIS10 | I HDUGLIS10 | 4629 |
| JUNBLIN | I JUNBLIN | 4630 |

FIG 10B

FACILITATING INSTANT MESSAGING OUTSIDE OF USER-DEFINED BUDDY GROUP IN A WIRELESS AND NON-WIRELESS ENVIRONMENT

CROSS REFERENCE TO RELATED APPLICATION

This application is a Continuation-in-part of U.S. patent application Ser. No. 09/519,525, filed on Mar. 6, 2000.

BACKGROUND OF THE INVENTION

1. Field of the Invention

The present invention generally relates to non-voice message transmission and reception across cellular and public or private data networks and, more particularly to a method and system for instant message delivery between a cellular and public data network that facilitates communication outside of user-defined buddy groups.

2. Description of Related Art

Around the world, tens of millions of users are using software that enables them to be alerted when friends, family and colleagues go on-line for real-time exchange of messages. A commonly used term for this type of real-time exchange is instant messaging. Instant messaging is extremely low-cost, with most vendors giving away the product and others charging nominal licensing fees. It is also powerful, allowing users to exchange messages in one window without interrupting a task in progress in another window; for example, looking over a document. Team members in different locations can set up impromptu conversations, bouncing ideas and strategies off each other. It provides quick and dirty collaboration, with little to buy and not much to set up.

The best-known instant messaging system is the AMERICA ONLINE® INSTANT MESSENGER® (AIM®) that was originally designed as a feature for AOL®'s pay service. AIM is software that anyone with an Internet connection can download, whether or not he or she is an AOL® (AMERICA ONLINE®) subscriber. After registering a person identifier such as a SCREEN NAME® or a ICQ number, the user can maintain lists of other AIM® users, referred to herein as buddies, and be alerted whenever one of those in the list comes on-line. When one of those in the list comes on-line, the corresponding personal identifier appears with an audiovisual alert in an AIM® interface window on the screen. By clicking on the name appearing in the AIM® interface window, the user may then send an instant message and initiate a conversation session. Users can also sort their buddies into groups. For example, a lawyer could create separate groups for partners, associates, in-house counsel.

Despite the apparent success of instant messaging, it has, until now, been limited to a user accessing the service through computer-based systems hardwired to the Internet. A co-pending U.S. patent application, C. Carey, B. Robinson, Method and system for messaging across cellular networks and a public data network, U.S. patent application Ser. No. 09/519,525 (Mar. 6, 2000), the entirety of which is hereby incorporated by reference, describes a system and method for instant message communication in wireless and non-wireless environments; thus extending the benefits of instant messaging to wireless environments, such as cellular phone systems. Using this system, an instant messaging subscriber can send and receive instant messages by means of a mobile unit device, such as a cell phone. Messages received may originate from a computer on a public data network, such as the Internet, or from other mobile unit devices. Furthermore, other instant messaging systems are known. For example, there are known instant messaging systems that send and receive messages by means of a command-line interface.

Messaging between the user and buddies is easy and efficient. Sending a message to a buddy merely requires that the mobile unit user select a buddy from a list of personal identifiers displayed on the user interface of the mobile unit, compose the message and send it. A means is provided for the mobile user to reply to an instant message from a buddy quickly and easily, merely requiring the user to select a 'reply' function.

Messaging between a mobile user and a non-buddy, that is someone not on the user's BUDDY LIST®, is somewhat more complicated, requiring the user to manually key in the non-buddy's personal identifier for each message sent from the phone. FIG. 8 provides a message flow diagram between a mobile unit 36 and a non-buddy 183. Step 181 illustrates the process of sending a message to a non-buddy. The system includes an 'unlisted' function for communicating with non-buddies, having a unique routing code. The user composes the message 181 A, including the non-buddy personal identifier in the body of the message, followed by a colon and a blank space, and sends it, using the 'unlisted' function. Upon receipt by the short message service center 32, the message is forwarded 181B to the instant message routing system 22. The instant message routing server captures the non-buddy personal indentifier and forwards the message to the desired recipient. Step 182 illustrates the process of sending a message to a mobile unit 36 from a non-buddy 183. As shown at 182A, reply to the message may be made only by way of an entirely new message, requiring the user to manually key in the non-buddy's personal identifier correctly and compose the message in an operation identical to that of 181A. If the personal identifier is incorrectly typed, the message will be rejected or lost, requiring that the user retype the entire message.

Given the variety of environments in which wireless devices are deployed and the small size of the keypads typically found on wireless devices, such operation is extremely cumbersome and time-consuming. Keying in the personal identifier and the message may require the user to key in tens of separate characters. An equally tedious alternative to keying in the personal identifier involves the use of the mobile unit's 'forward' feature. The user edits the received message to leave only the non-buddy personal identifier of the original message, the reply is composed and the message is forwarded to the unlisted routing code, requiring the mobile user to remember the routing code of the 'unlisted' function and key it in manually. An embedded client (built into the handset of a wireless device, for example a Nokia 3390 Gold phone) assigns an index to all listed names and each unlisted name that is in conversation. Alternately, the unlisted name (unique ID) is associated with the conversation and attached to each reply message.

Other wireless instant messenging systems may use a single routing number for all mobile-originated requests. They require the user to enter a command code at the beginning of some or all messages to specify the action, and enter the ID of the recipient in each message.) An index is assigned to all listed names and each unlisted name that is in conversation. Alternately, the unlisted name (unique ID) is associated with the conversation and attached to each reply message.

It would be a great advantage to provide a method and system for messaging across cellular networks and a public data network that included a feature for easy reply to instant messages from a non-buddy, greatly facilitating instant messaging between a mobile unit user and parties not listed in the user-defined list.

SUMMARY OF THE INVENTION

In a system for instant message communication in a wireless and non-wireless environment, messages are sent from and received by a mobile unit device over a wireless communication network. A registered user of the instant messaging system creates a list, for example an AIM® BUDDY LIST®, of people with whom the user frequently exchanges instant messages, by providing the buddies' instant message personal identifiers. Each instant message personal identifier is associated with a destination address, also known as a routing code, at the instant message system. This association is saved in memory in the instant message system and conserves phone number addresses in the telephone network. An address loading program is sent through the wireless environment to the mobile unit device of the registered user and loads the list, including personal identifiers and the associated routing numbers into the memory of the mobile unit. When the mobile unit user wishes to send a message to someone on his or her list, the user merely selects the personal identifier from the displayed list, composes the message and sends it. When the mobile unit user wishes to reply to a message received from a sender on the name list, the user merely selects a 'reply' function and the reply is processed by the system in accordance with the previously saved information.

Within the above system, a method and apparatus for facilitating instant messaging outside of a user-defined buddy group provides a feature that allows easy reply to a sender not in the user's buddy group, i.e. a "non-buddy." The instant messaging system provides at least one additional routing code reserved for conversing with non-buddies. When the system receives an instant message for a user from a non-buddy, before routing the message to the user's mobile device, the non-buddy's personal identifier is associated with a reserved routing code. The mobile user then may reply to the message using the same 'reply' function available for replies to buddies. Likewise, when the mobile user initiates a message to a non-buddy, the system captures the non-buddy's personal identifier and associates it with a reserved routing code. Thereafter, the user can reply to messages from the non-buddy by using an automated 'reply' function on the wireless device. The non-buddy routing code assignment is usually only for the duration of a user session, or until reassigned. When the mobile user signs off from the system, the routing code becomes available for reassignment.

BRIEF DESCRIPTION OF THE DRAWINGS

FIG. 10 shows a table of exemplary routing codes for use by users of mobile units according to the invention.

DETAILED DESCRIPTION

Figure 1:
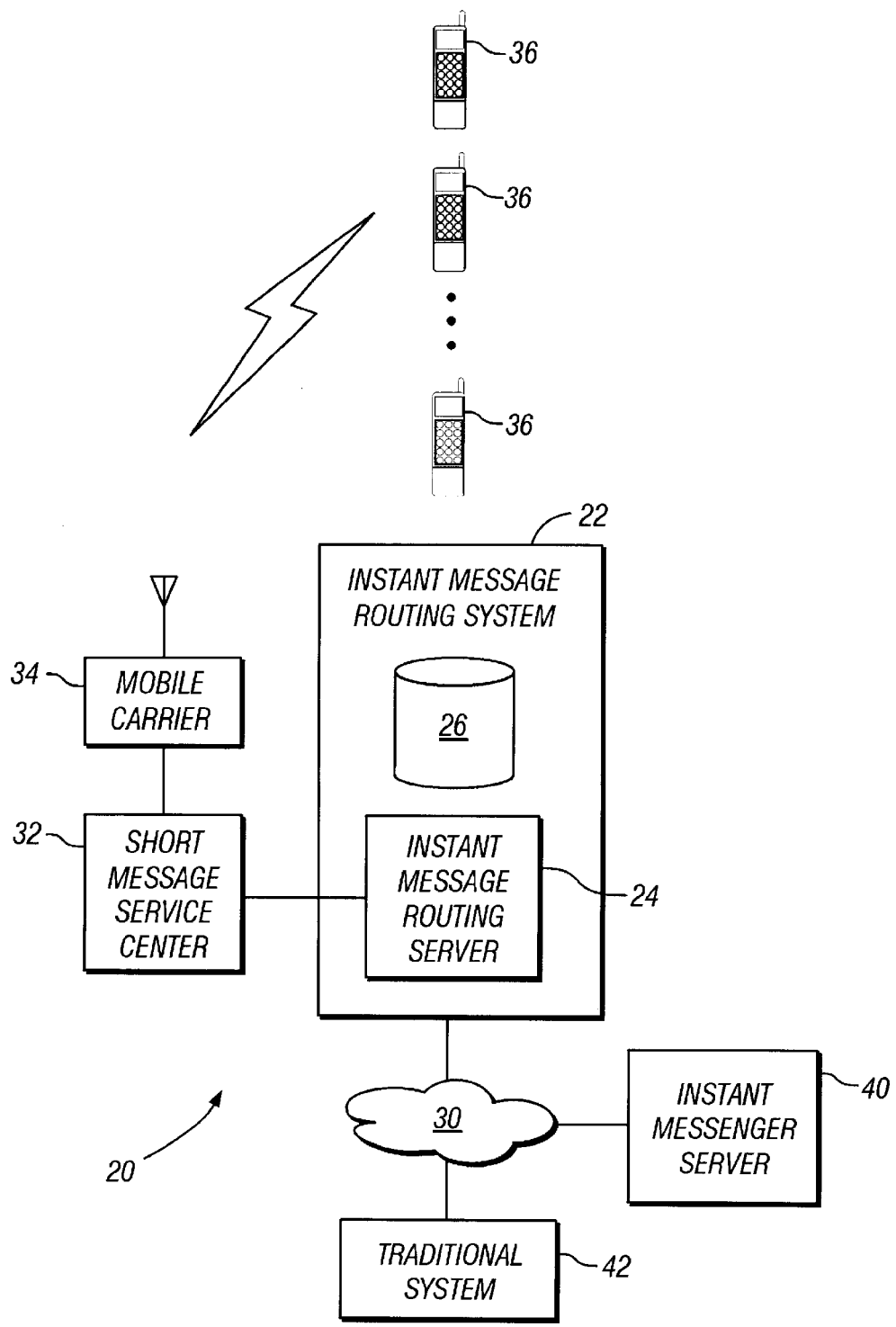
FIG. 1 is a block diagram of a system for instant message communication in a wireless and non-wireless environment according to the invention.

Described herein are an integrated wireless and traditional instant messaging system and method. As shown in FIG. 1, the system 20 includes an instant message routing system 22 that includes a routing server 24 and a database 26 for storing a profile for each subscribing user. Each user profile includes a list of instant message names with each name assigned to an address (phone number). The routing server 24 is in communication with one or more short message service centers (SMSC) 32 that are in communication with one or more wireless mobile carriers 34. Each wireless mobile carrier 34 supports subscribing users operating mobile unit devices 36, such as a hand-held cell phone, a two-way pager or other SMS-based device. The routing server 24 is also coupled to a public or private data network 30, such as the Internet. Also coupled to the public or private data network 30 are an instant message server 40 and one or more traditional systems 42, such as a personal computer.

The communication link between the routing server 24 and the short message service center 32 is also either a public or private data network, such as the Internet or a private dedicated circuit. A protocol residing over the communication link defines the structure of information communicated between the routing server 24 and the short message service center 32. Preferably, this link is the Internet with TCP/IP operating thereon. Operating over TCP/IP is another protocol that allows the routing server 24 to identify the effectiveness of communications to the mobile unit devices 36. An example protocol residing over TCP/IP is the short message peer-to-peer (SMPP) protocol or configuration or data management procedure (CDMP) protocol. These protocols provide visibility of the status of message deliveries to the mobile unit devices 36.

A data bearer protocol defines the structure of data messages communicated between the mobile unit devices 36, the mobile carrier 34 and the short message service center 32. The global system for mobile communications (GSM) environment, used as the primary digital wireless standard throughout Europe, uses the short message service (SMS) standard data bearer protocol for formatting data for delivery between the mobile unit devices 36, wireless mobile carrier 34 and the short message service center 32. The SMS protocol describes the format of data, called SMS packages, sent or received through the system. The format of data messages, i.e. SMS package, sent from the mobile unit device includes the phone number of the mobile unit device, a destination phone number, the short message service center address (preferably a number), a validity period value and message content. The validity period value informs the short message service center 32 how long to attempt delivery. Each data message (SMS package) is preferably a single block of information. As can be readily appreciated by those of ordinary skill in the art of wireless communication, the SMS package may be divided up into multiple packets of data and sent at various intervals.

Figure 2:
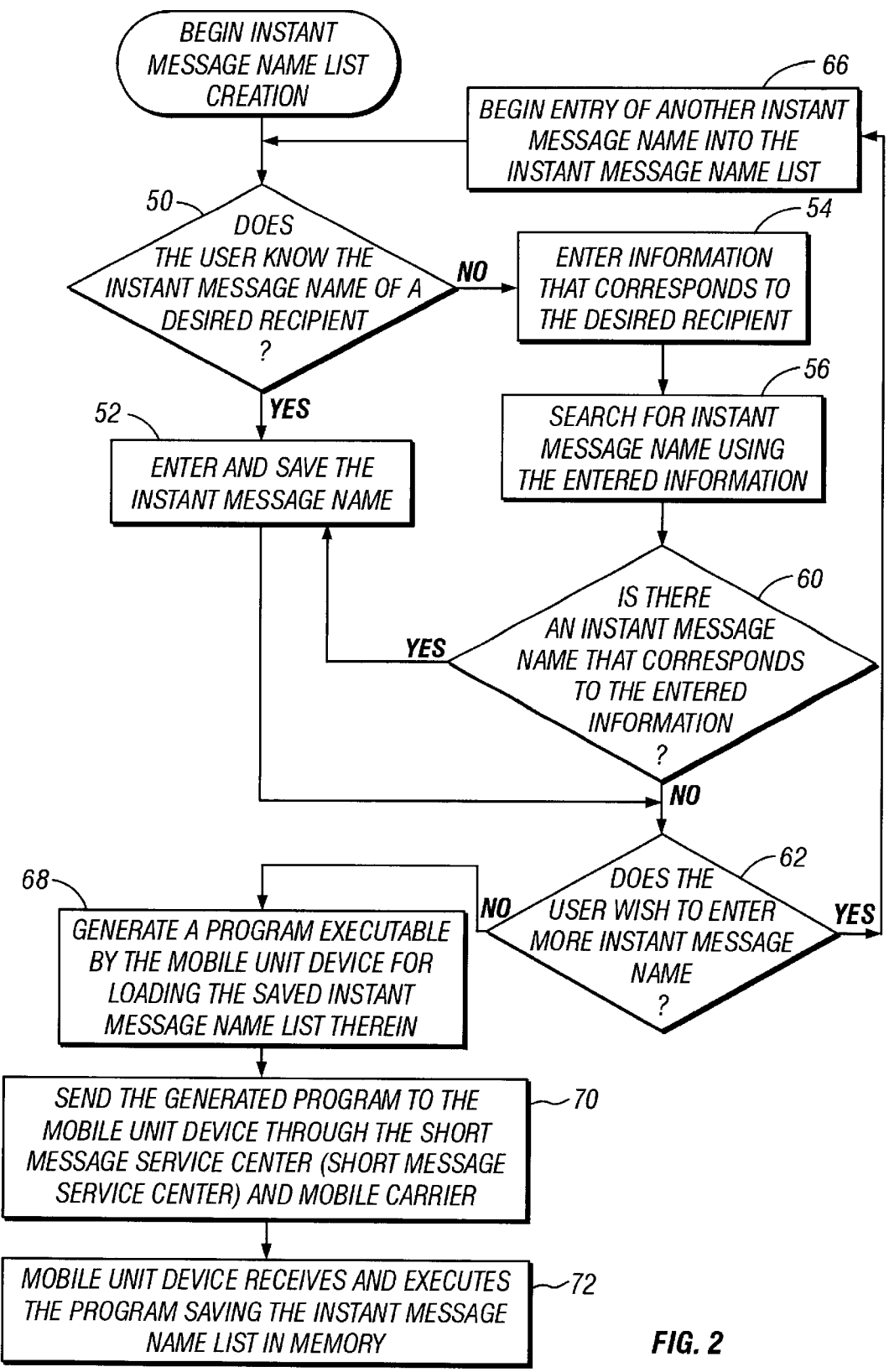
FIG. 2 is a flow diagram illustrating a process for remotely creating an instant message name list for a cellular phone according to the invention.
Figure 3:
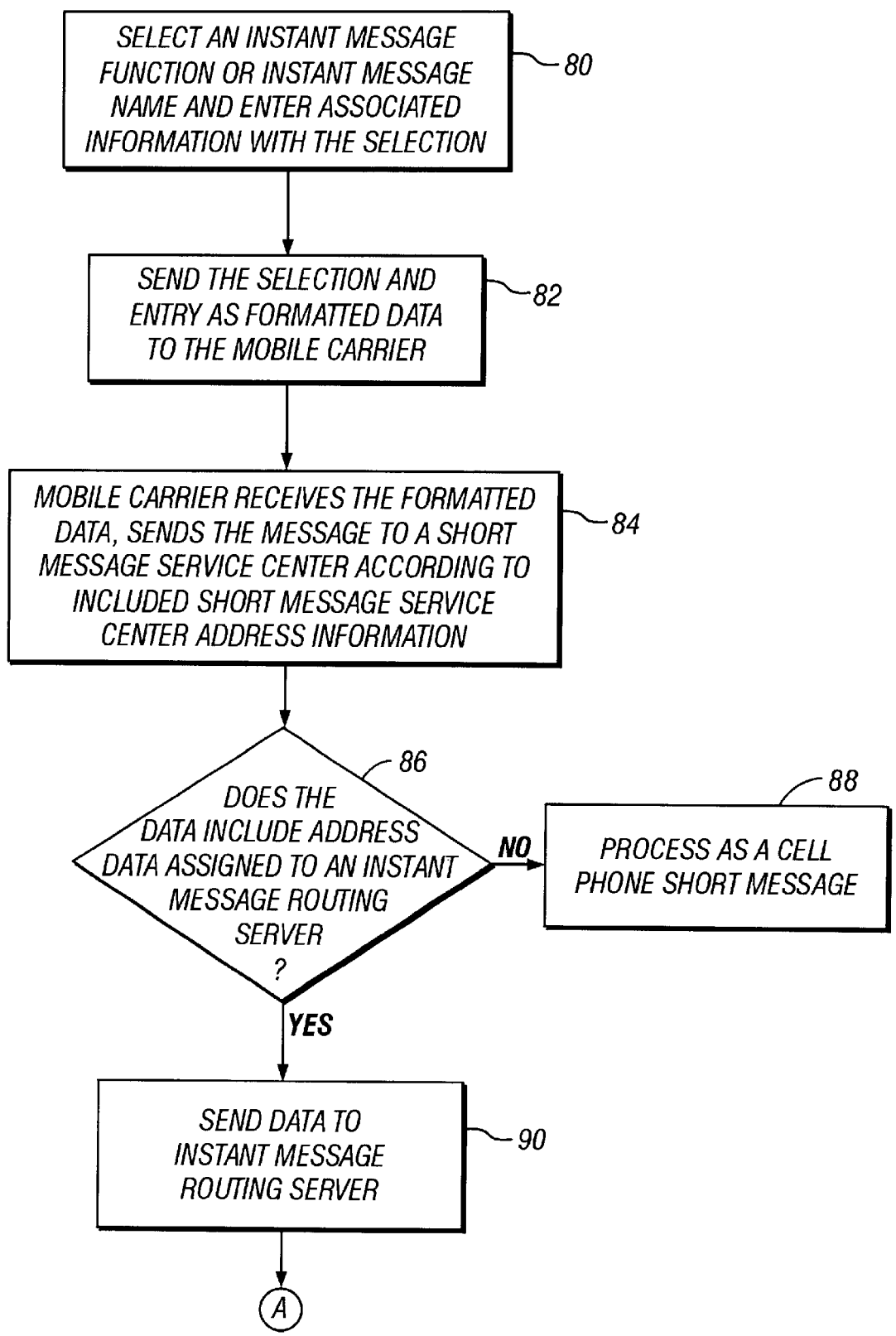
FIGS. 3–7 are flow diagrams illustrating processes for instant message function delivery, message delivery and instant message reception using a mobile unit device across a wireless and non-wireless network according to the invention.

FIG. 2 illustrates a method for remotely creating an instant message name list for a cellular phone. First, a user, who is a subscriber to a wireless instant message service, uses a traditional system 42 coupled to the network 30 to sign on to a web site supported or generated by the routing server 24. A user becomes a subscriber by completing a registration process that can be performed during online communication with either servers 24 or 40 or through other means, such as e-mail, conventional mail or telephonic communication. Once the user has entered into the routing server's web site by preferably completing a sign-on or logon with password verification, the user begins instant message name list creation for the user's mobile unit device 36. If the cell phone user knows the instant message name that corresponds to a desired recipient, decision block 50, the user enters the instant message name. The entered instant message name is then saved in a look-up table at a location in the database 26, block 52. The look-up table is stored in relation to predefined user profile information. Each instant message name stored in the look-up table has a corresponding destination address, preferably a phone number. For example, the routing server 24 receives from the mobile carrier 34 or a telecommunications controlling agency a set of n telephone numbers. In the database 26 for each user profile, the server 24 associates a number from the set of n telephone numbers to an entered instant message name. As a result, the routing system 22 reuses a limited number of phone numbers.

If the cell phone user does not know the instant message name that corresponds to a desired recipient, decision block 50, the user enters information that corresponds to the desired recipient, such as an e-mail address, block 54. The server hosting the name list creation website then searches for an instant message name that corresponds to the entered information, block 60. If, at decision block 60, there is a corresponding instant message name, the corresponding instant message name is entered and saved, see block 52 above. If, at decision block 60, the search fails to find a corresponding instant message name, no name entry occurs and the user is given the opportunity to enter more instant message names, decision block 62. The user is also given the opportunity to enter more instant message names after block 52.

If, at decision block 62, the user does not wish to enter more instant message names, a program is generated by the server hosting the name list creation website for programming the created instant message name list into the user's mobile unit device 36, block 68. Next, at block 70, the generated program is sent through the short message service center 32, where it is formatted according to the proper protocol, and then through the mobile carrier 34 to the user's mobile unit device 36. At block 72, the user's mobile unit device 36 receives and executes the program, thus saving the instant message name list in an address book stored in memory. In other words, the mobile unit device is programmed in an over-the-air-programming manner to include the instant message name list within the mobile unit device's instant message listings (i.e. address book).

In an alternative embodiment, if the mobile carrier 34 and corresponding mobile unit devices 36 do not include the hardware or software components for receiving and executing the program for loading the saved instant message name list, the loading of instant message names and corresponding phone numbers that are stored at the routing system 22 are manually entered into the address book of the user's mobile unit device 36.

FIGS. 3–7 illustrate the process of instant message function delivery, message delivery and instant message reception using a mobile unit device across a wireless and non-wireless network. First, at block 80 of FIG. 3, through a user interface on the mobile unit device 36 the user selects an instant message function or an instant message name(s) from the mobile unit device's address book based on the latest stored instant message name status information received from the instant message name routing server 24 as a result of a sign on, a status update or the last communication with the instant message routing server 24 (see FIG. 5 below). Then, the user enters message content information (either function related information or a message accordingly). Alternatively, the message content information is entered first, then an instant message function or an instant message name is selected. Next, at block 82, the user's selection and entered information is formatted according to the predefined protocol and sent to the mobile carrier 34. At block 84, the mobile carrier 34 receives the formatted data and sends the formatted data to a short message service center 32 according to the included short message service center address information. At decision block 86, the short message service center 32 determines if the received formatted data includes address data assigned to an instant message routing server 24, i.e. an address field or phone number. If the formatted data does not include address data assigned to an instant message routing server 24, the formatted data is probably an phone-to-phone short message and is processed according to known cellular Short Message processing methods, block 88; also commonly referred to as email for cell phones. If the formatted data does include address data assigned to an instant message routing server 24, the formatted data is reformatted according to the predefined protocol used to communicate information between the short message service center 32 and the instant message routing server 24 and then sent to the instant message routing server 24, block 90.

Figure 4:
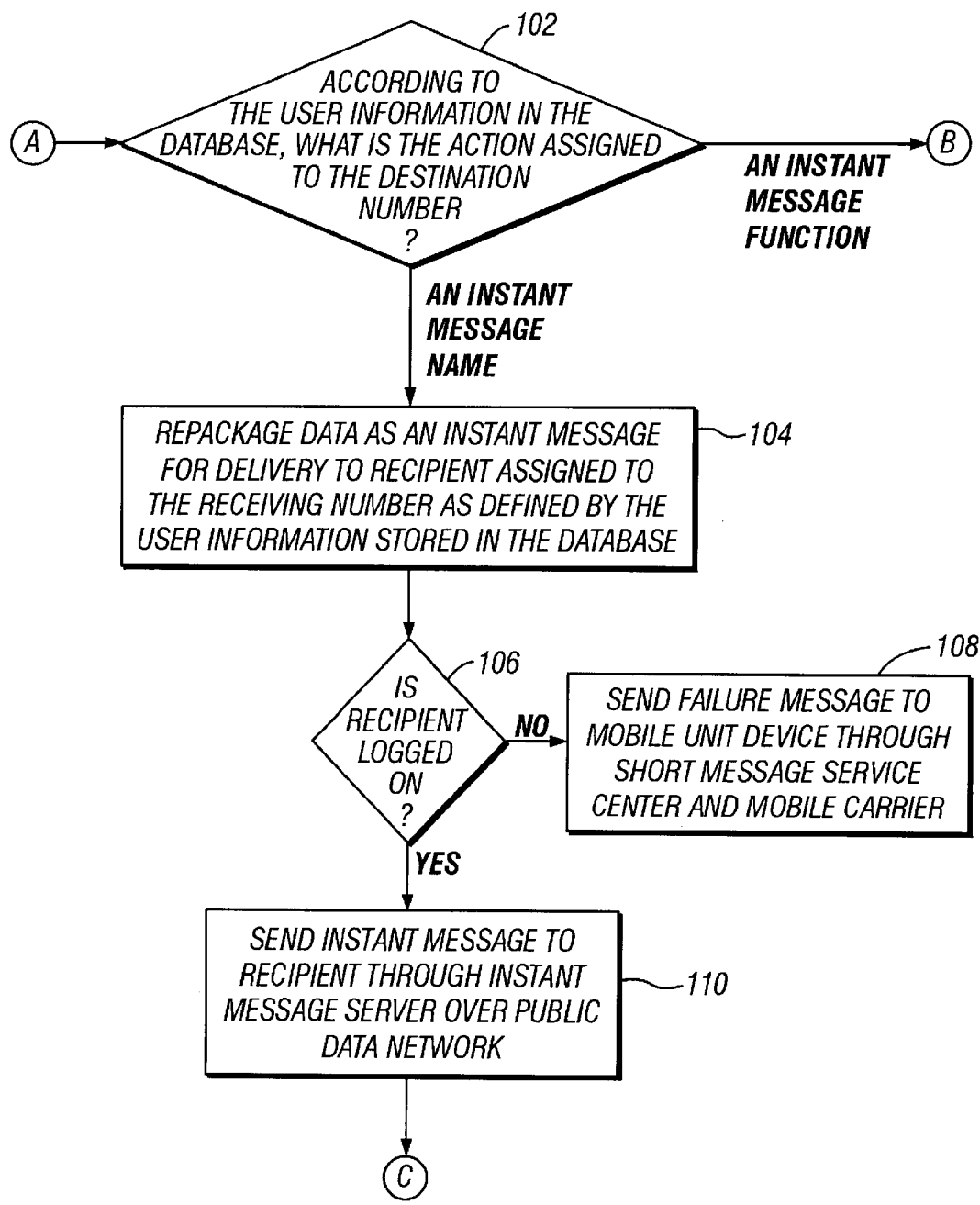

As shown in FIG. 4, at decision block 102, the instant message routing server 24 compares the destination number included in the reformatted data to the look-up table in the user profile location in the database 26 that corresponds to the mobile unit device phone number included with the received data. The comparison determines what action corresponds to the destination number. If the action corresponding to the destination number is an instant message function, the instant message routing server 24 executes the instant message function, see FIG. 5 below. If the action corresponding to the destination number is an instant message name, the instant message routing server 24 repackages the formatted data as an instant message and sends it to the recipient associated with instant message name, block 104. Before or after the repackaging occurs, the instant message routing server 24 determines if the recipient that corresponds to the instant message name is signed on to the instant message system, i.e. the instant message server 40, decision block 106. If the recipient is not signed on, the instant message routing server 24 sends a failure message to the user's mobile unit device 36 through the short message service center 32 and mobile carrier 34, block 108. In a first alternate embodiment, if the recipient is not signed on, the instant message server 40 stores the instant message until the instant message server 40 detects that the recipient has signed on through an instant message routing server 24 or a traditional system 42. In a second alternate embodiment, if the recipient is not signed on, the instant message is forwarded to a previously designated e-mail address.

If the recipient is signed on, the instant message routing server 24 sends the instant message to the recipient through the instant message server 40 over the network 30, block 110. The process of sending an instant message to a mobile unit device recipient is described in more detail below in FIGS. 6 and 7.

Figure 5:
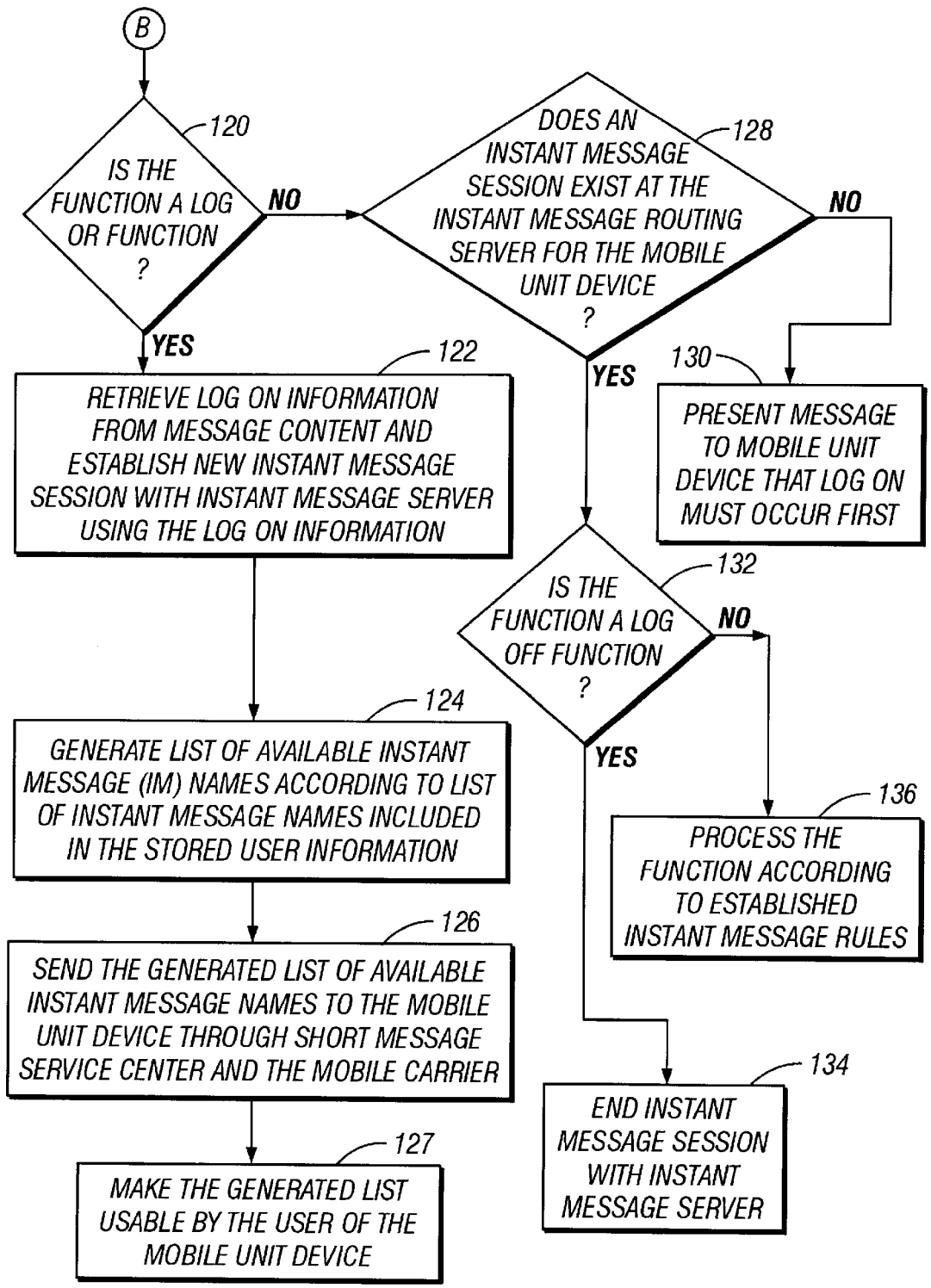

FIG. 5 illustrates the process of processing data received from a mobile unit device 36 that corresponds to an instant message function, from B of FIG. 4. First, at decision block 120, if the function is a sign on function, the instant message routing server 24 establishes a new instant message session with the instant message server 40 for the user associated with the mobile unit device 36 that send the sign on function. The establishment of a new instant message session is done in accordance with the proper password(s) that was included in the message content sent from the mobile unit device 36, block 122. The instant message routing server 24 checks with instant message server 40 to determine which of the names in the instant message name list associated with the user and stored in the database 26 are available or signed on, block 124. This determination of who is available is then sent to the mobile unit device 36 through the short message service center 32 and the mobile carrier 34, block 126. Once the mobile unit device 36 receives the availability determination, the device 36 process it and makes the availability information available for use by the user, block 127.

If the instant message function is not the sign on (sign on) function and if no instant message session is presently active for the user at the instant message routing server 24, decision block 128, a message informing the user that sign on must occur first is presented, block 130. If an instant message session exists and the function is a sign off (sign off) function, decision block 132, the instant message routing server 24 ends the corresponding instant message session, block 134. However, if the function is not the sign off function, the function is processed according to instant message rules, block 136. The following other functions are available: delete; add; and check status. With regards to the delete function, the instant message routing server 24 deletes each instant message name included in the message content from the instant message name list stored with the user's profile information in the database 26. With regards to the add function, the instant message routing server 24 adds each instant message name included in the message content to the instant message name list stored with the user's profile information in the database 26. During instant message session the instant message routing server 24, like an instant message session on a traditional system 42, continually receives connection status information of each instant message name in the instant message name list. With regards to the check status function, the instant message routing server 24 sends the latest received connection status information to the mobile user device 36 through the short message service center 32 and the mobile carrier 34.

Figure 6:
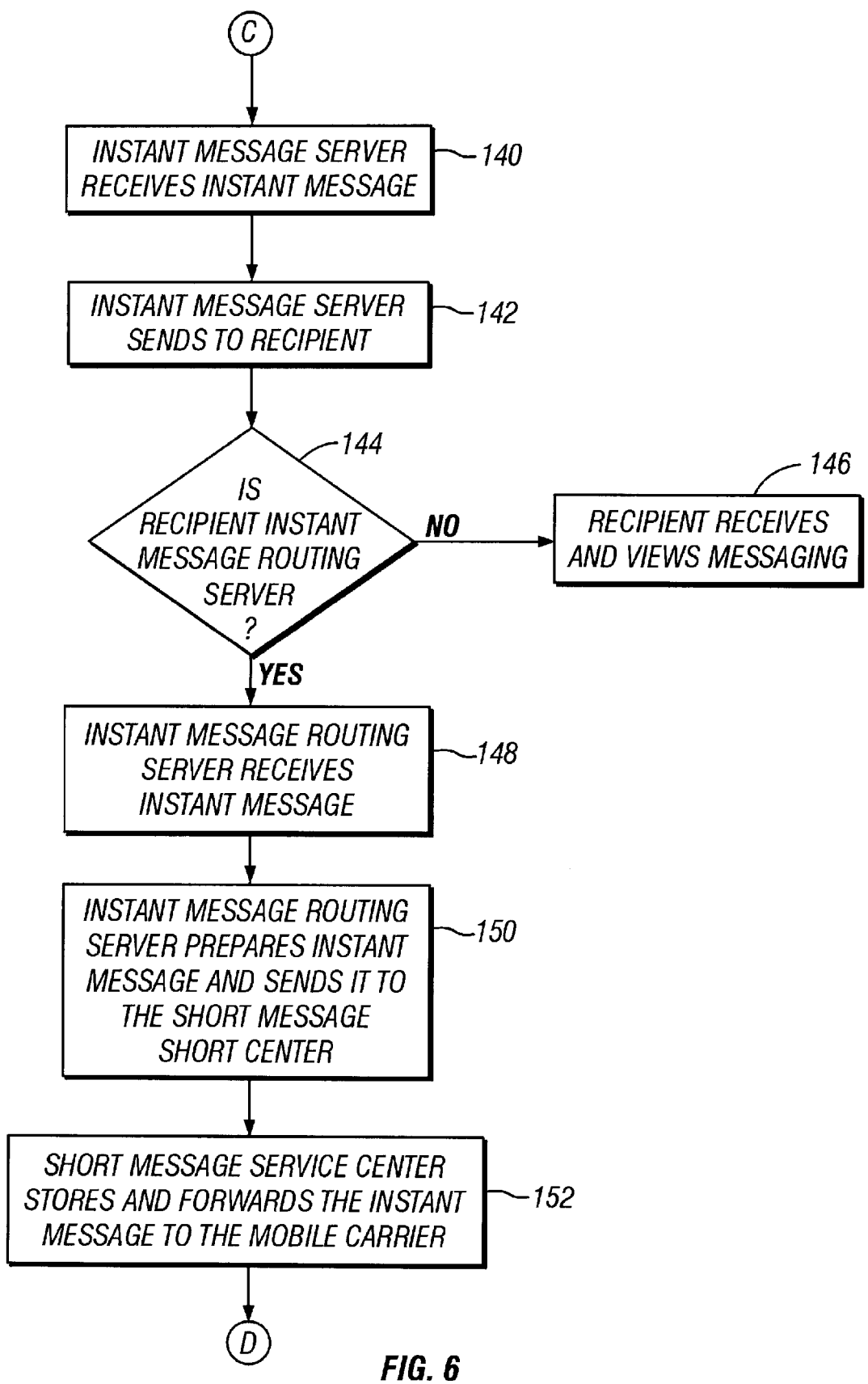
Figure 7:
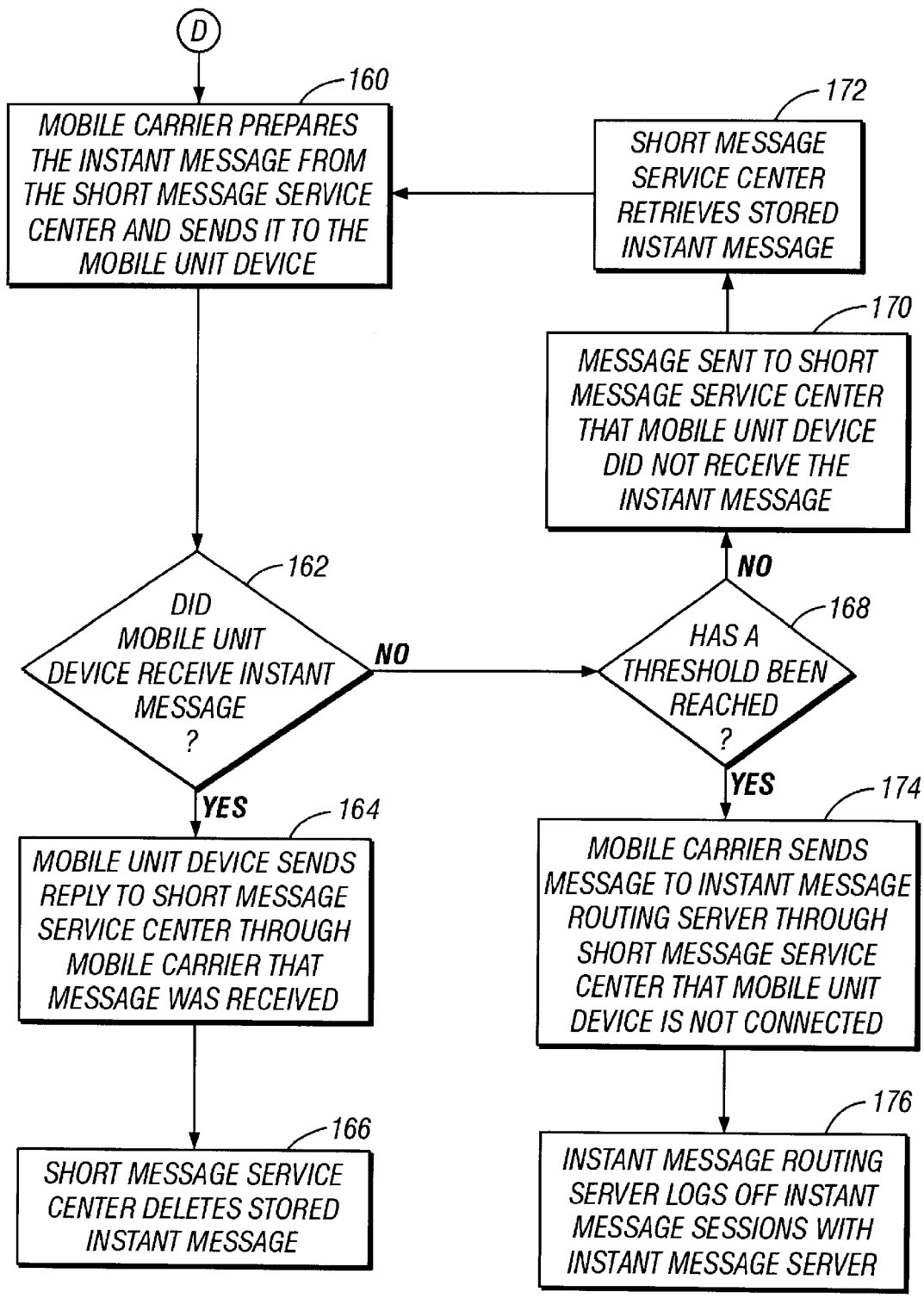

FIGS. 6 and 7 illustrate the process of sending an instant message to a recipient signed on to the instant message service from a mobile unit device 36 through an instant message routing server 24. The process of FIG. 6 occurs when an instant message is sent from another user of a mobile unit device 36, C from FIG. 4, or from a user of a traditional system 42, such as a desktop or laptop computer. First, at block 140, the instant message server 40 receives an instant message and, at block 142, sends it to the signed on recipient identified in the instant message. If, at decision block 144, the recipient is a normal instant message recipient, i.e. not a recipient with an instant message session active through the instant message routing server 24, the recipient receives and views the instant message as per instant message procedures, block 146. If, on the other hand, at decision block 144, the recipient is a user with an instant message session active through the instant message routing server 24, the instant message routing server 24 receives the instant message, block 148. Then, at block 150, the instant message routing server 24 prepares the received instant message according to the predefined protocol and sends the prepared instant message to the short message service center 32, where the short message service center 32 stores and forwards the instant message to the mobile carrier 36 according to the predefined wireless protocol, block 152.

As shown in FIG. 7, at block 160, the mobile carrier 36 prepares the instant message received from the short message service center 32 for transmission and sends the prepared transmission to the mobile unit device 36. If, at decision block 162, the mobile unit device 36 successfully receives the prepared transmission of the instant message, the mobile unit device 36 replies to the short message service center 32 that the transmission was received, block 164. Then, at block 166, the short message service center 32 receives the mobile unit device's successful reply and deletes the stored instant message.

If, however, at decision block 162, the mobile unit device 36 did not successfully receive the prepared transmission of the instant message and if, at decision block 168, a transmission delivery threshold has not been reached, a message is sent to the short message service center 32 that the mobile unit device 36 did not successfully receive the instant message, block 170. This message of unsuccessful reception is sent by the mobile carrier 34. When the short message service center 32 receives a message of unsuccessful reception, the short message service center 32 retrieves the stored instant message that corresponds to the unsuccessfully sent transmission and resends the transmission to the mobile unit device 36 through the mobile carrier 34, blocks 172 and 160.

Again, at decision block 162, if the mobile unit device 36 did not successfully receive the prepared transmission of the instant message and if, at decision block 168, a transmission delivery threshold has been reached, the mobile carrier 34 sends a message to the instant message routing server 24 through the short message service center 32 that the mobile unit device 36 is not connected or not receiving instant messages, block 174. When the instant message routing server receives a message of this type, the instant message routing server 24 signs off or logs off the mobile unit device 36 that failed to receive the transmission, block 176. Alternatively, the user may undergo a change of presence status, such as "busy" or "unavailable." The transmission delivery threshold is preferably a predefined number of delivery attempts.

Once the number of attempts have been reached or exceeded, the mobile carrier 34 assumes the mobile user device 36 is off or out of reception range. It can be readily appreciated by those of ordinary skill in the art of cell phone communication, that various data delivery methods can be used for insuring information gets delivered during temporary periods of time when the cell phone is out of communication with the mobile carrier. In addition to those functions previously described, the mobile unit provides at least the following additional functions:

'unlisted;'
'forward;' and
'reply.'

It is noted that 'unlisted' is conceptually different from 'forward' and 'reply' in that 'unlisted' denotes an instant messaging user class, and the system function required to interact with that class, whereas 'forward' and 'reply' constitute message manipulation functions built into the device itself.

Figure 8:
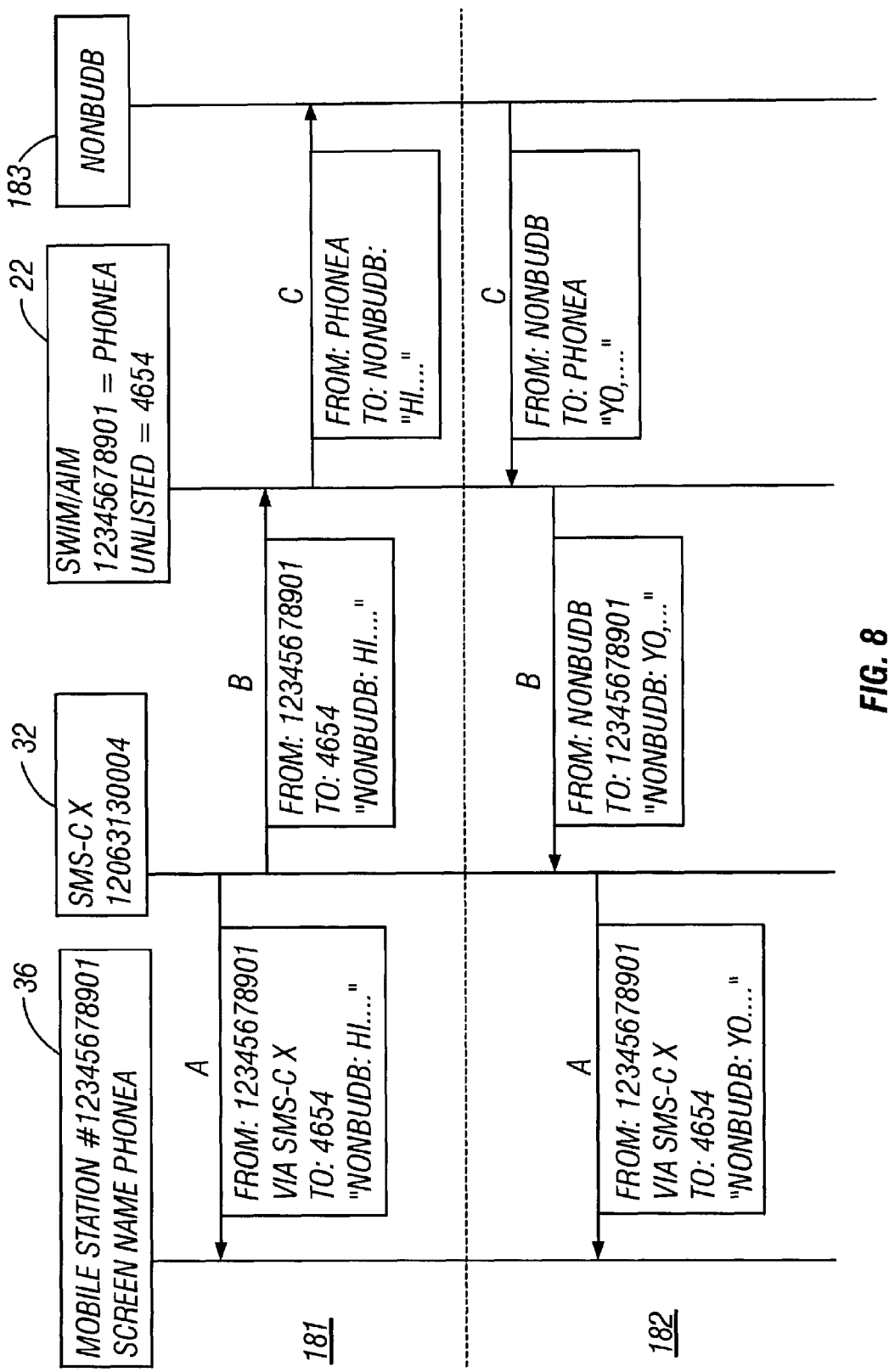
FIG. 8 provides a message flow diagram between a mobile unit and a non-buddy according to the invention.
Figure 9A:
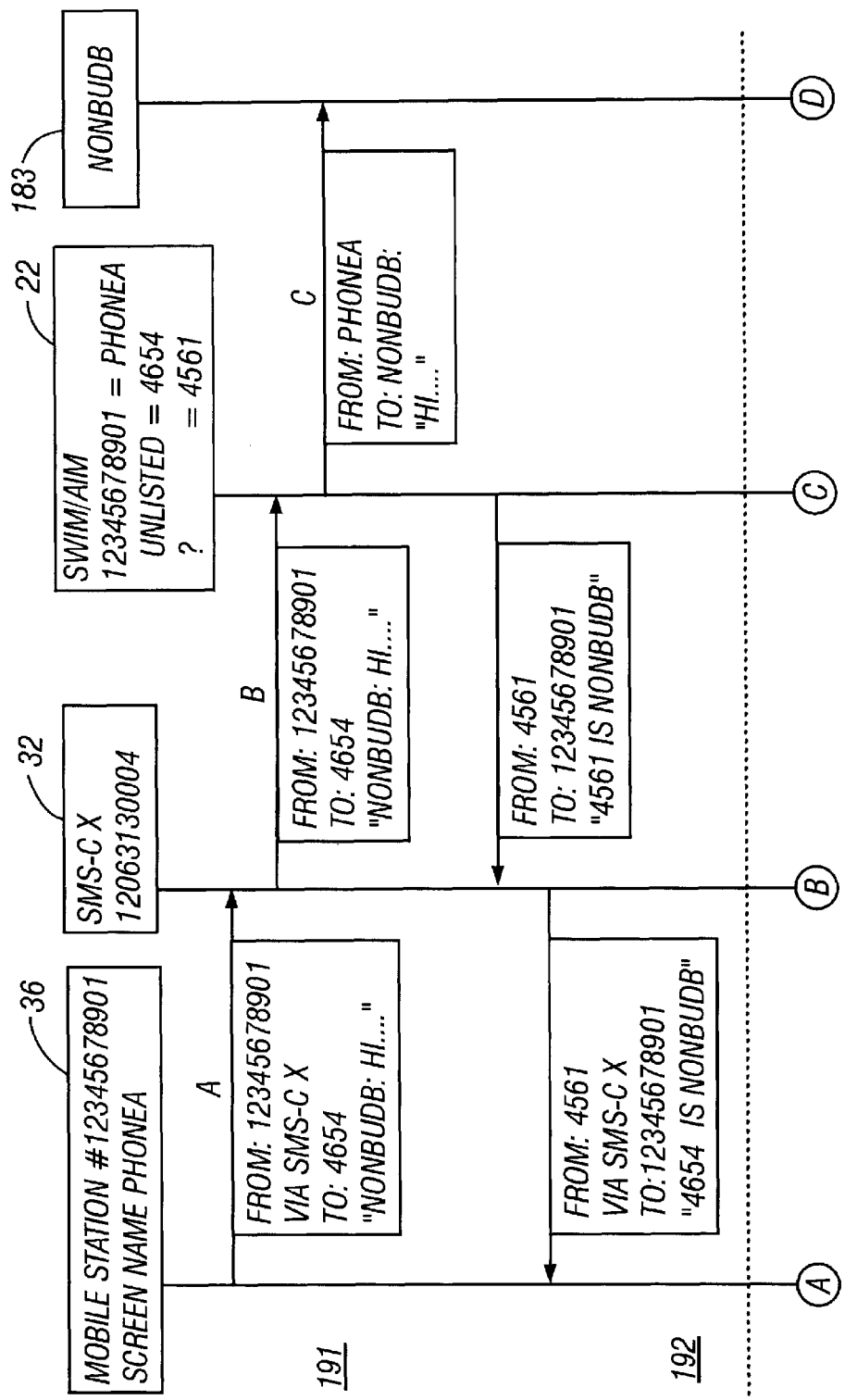
FIG. 9 provides a message flow diagram between a mobile unit and non-buddy using a non-buddy easy reply feature according to the invention.
Figure 9B:
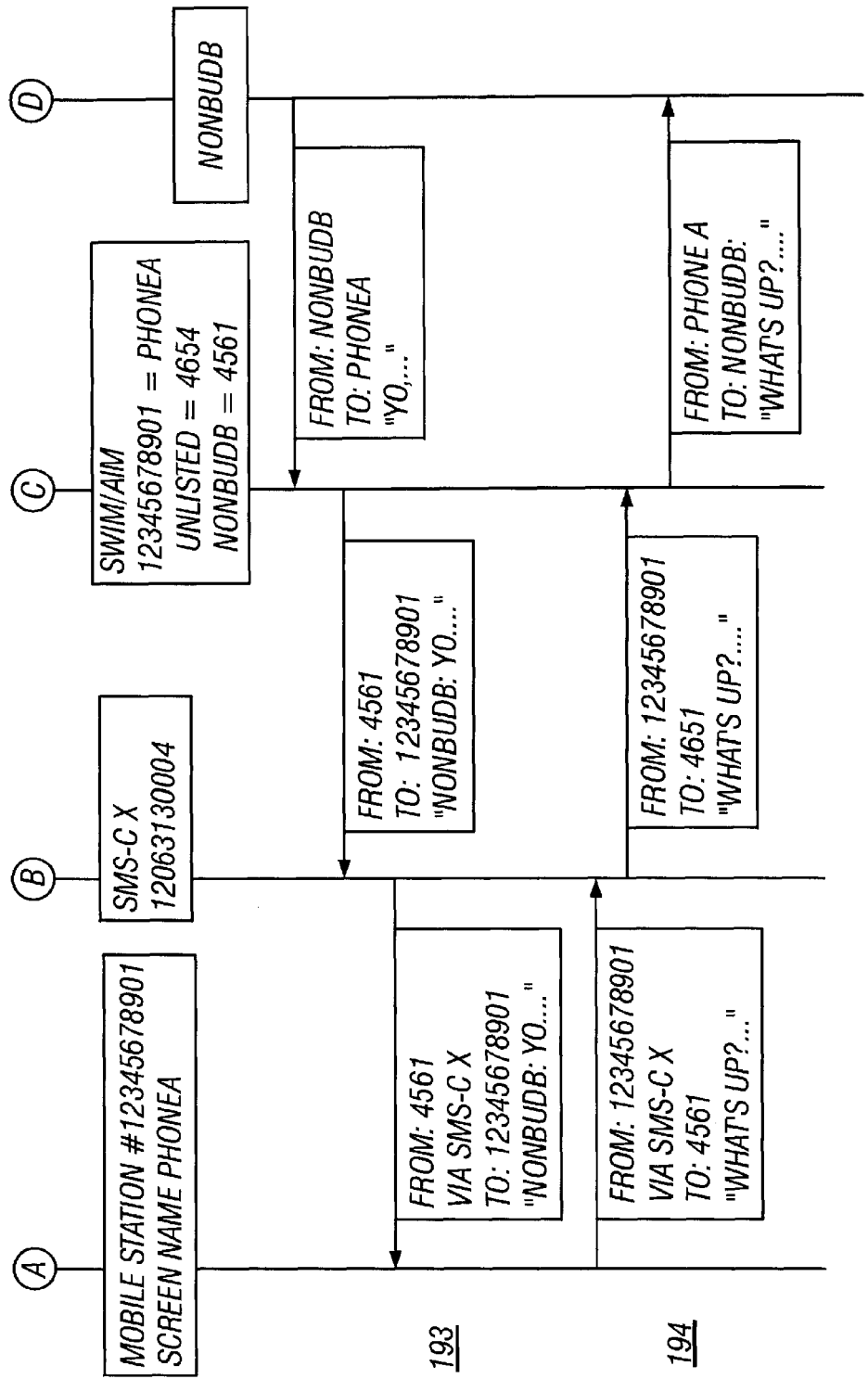

FIGS. 8 and 9 illustrate the flow of messages between mobile units 36 and traditional system 42 users who are not identified as preferred friends of the mobile unit 36 instant messaging user. FIG. 8 depicts the message flow under existing systems, while FIG. 9 depicts the message flow in accordance with the invention.

FIG. 8 shows a message flow diagram between a mobile unit 36 and a non-buddy 183 using a conventional system 42. The body of the message 181 is explicitly targeted to the non-buddy 183 with the text "NonBudB:" at the beginning of the message, as seen in 181A. The message 181A travels from the mobile unit 36 to the short message service center (SMS-C) 32, such that the Destination Address of 4654 is not analyzed until received by the short message service center 32. The short message service center 32 recognizes that the destination address belongs to the family of addresses for instant messaging and the message 181B is forwarded to the instant message routing system 22. The instant message routing system 22 reformats the message by extracting the non-buddy's instant message address of "NonBudB" and forwards the reformatted message 181C to the traditional system 42, either directly or through the instant messenger server 40.

The messages in 182 indicate the process in reverse of 181, wherein a traditional system 42 non-buddy 183 sends a message 182A to mobile unit 36 by addressing the message to "PhoneA" as a normal instant message. The instant message routing system 22 reformats the message 182B by prefixing the non-buddy's instant message address "Non-BudB" to the message body, also by attaching the telephone number of "PhoneA" which in this example is 12345678901, and forwards the reformatted message 182C to the short message service center 32. The short message service center 32 stores the message and attempts delivery. For the purposes of FIG. 8 the message is delivered to the mobile unit 36. The mobile unit 36 presents the message to the user. For the mobile unit 36 to send a message back to non-buddy 183, the entire process of 181 is repeated, including the re-entering of the traditional system 42 personal identifier.

The instant message routing system 22 reformats the message 182B by prefixing the non-buddy's instant message address "NonBudB" to the message body, also by attaching the telephone number of "PhoneA" which in this example is 12345678901, and forwards the reformatted message 182C to the short message service center 32.

In accordance with the invention, FIG. 9 shows a message flow diagram between a mobile unit 36 and a non-buddy in which message flow is faciliated by a non-buddy easy reply feature. Step 191 illustrates the process of sending a message to the non-buddy from the mobile unit. As in 181A, The user composes the message 191A, including the non-buddy personal identifier in the body of the message, followed by a colon and a blank space, and sends it, using the 'unlisted' function. The message is received at the short message service center 32 and forwarded 191B to the instant message routing system 22. The instant message routing system 22 provides at least one routing code reserved for the non-buddy easy reply feature, denoted in FIG. 9 by the code '4561.' Upon receipt of the message, the instant message routing server 24 captures the non-buddy's name from the body of the message and assigns an easy-reply routing code, e.g. '4561.' Subsequently, the message is forwarded 191C to its destination, non-buddy NonBudB183. In an optional step 192, the instant message routing server 24 returns a notification of the easy-reply routing code assignment to the mobile unit 36 to aid in subsequent messaging.

In an alternative emobidment, the 'unlisted' routing code becomes associated with a non-buddy, for easy-reply, until a second non-buddy exchange is started. This association can be automatically reset by a period of inactivity.

As step 193 shows, when the non-buddy 183 is the first to send a message, the instant message routing server 24 immediately assigns an easy-reply routing code, whereupon the mobile unit 36 and the non-buddy 183 are able to exchange messages readily and efficiently, as shown in step 194, with no greater effort than required of two SMS phone users.

One can easily imagine a second non-buddy 195 sending a message to the mobile user 36 during a conversation with the first non-buddy 183, creating a race condition. In the event that the available routing codes have all been assigned when the system receives the message from the second non-buddy, the system recycles routing codes. Thus, a situation may occur in which the mobile user has sent a message using an easy-reply routing code, but the code is reassigned before the message reaches the instant message routing server, with the result that the non-buddy the code has been reassigned to receives the message intended for the first non-buddy. Because experience shows that a mobile user typically starts a non-buddy conversation approximately once in a twelve-hour period, the possibility of a race condition occurring is slight. Nevertheless, the possibility of a race condition occurring is minimized in one or both of two ways:

The instant messaging server can hold the non-buddy message pending confirmation of the mobile user's interest in receiving the message; and A bank of easy reply routing codes are provisioned, minimizing the possibility that the system will be faced with the necessity of recycling routing codes during a user session.

Easy reply routing code assignments usually persist only for the duration of a user session, or until reassignment, for example when there are more buddies than routing codes. When the mobile user signs off from the system, the routing code becomes available for reassignment. An embodiment is also possible in which routing code assignments survive logoff.

FIG. 10 provides a table of exemplary routing codes. As previously explained, the invention uses such codes for messaging with non-buddies, as well as for messaging with buddies, and system commands.

In an alternative embodiment, the wireless instant messaging system may use a single routing number for all mobile-originated requests, and then assign another routing number for each sender in the manner described above to simplify the exchange of further messages.

The invention is embodied as a method, an apparatus and a computer program product. Implementation of the invention is accomplished by means of conventional methods of computer programming using one or more commonly known programming languages.

Although the invention has been described herein with reference to certain preferred embodiments, one skilled in the art will readily appreciate that other applications may be substituted for those set forth herein without departing from the spirit and scope of the present invention. Accordingly, the invention should only be limited by the Claims included below.

What is claimed is:

1. A method of facilitating instant messaging outside of a user-defined buddy group, comprising the steps of:

providing a plurality of reserved routing codes for exchanging instant messages with users not included in said user-defined buddy group;

exchanging instant messages between a user of a mobile unit device and a second user, said second user not included in said mobile user's buddy group;

assigning one of said routing codes to a message directed to said second user by said mobile unit user; and temporarily assigning one of said routing codes to said second user's personal identifier so that said mobile user can easily reply to said second user without originating a new message.

2. The method of claim 1, wherein said step of exchanging instant messages comprises the steps of:

composing a message for said second user by said mobile user, said message including at least said second user's personal identifier in body of said message;

sending said message to a routing code assigned to an 'unlisted' function on said mobile device;

receiving said message at said instant messaging system;

capturing said second user's personal identifier by said instant messaging system;

assigning a routing code to said second user's personal identifier; and sending said message to said second user; and optionally returning notice of said assignment to said mobile user, so that future messaging is facilitated.

3. The method of claim 1, wherein said step of exchanging instant messages comprises the steps of:

sending a message to said mobile user by said second user;

receiving said message at said instant messaging system;

capturing said second user's personal identifier by said instant messaging system;

assigning a routing code to said second user's personal identifier; and sending said message to said mobile user.

4. The method of claim 1, wherein said step of exchanging instant messages comprises the steps of:

receiving a message at said mobile unit from said second user, wherein said second user's personal identifier has previously been associated with a second routing code; and replying to said received message by said mobile user by means of an automated 'reply' function on said mobile unit.

5. The method of claim 1, wherein assignment of a routing code to said second user persists for the duration of a user session.

6. The method of claim 1, wherein routing codes for assignment to a second user are recycled during a user session if the number of second users exceeds the routing codes available for second users.

7. The method of claim 6, further comprising the step of:

preventing occurrence of a condition wherein different second users are associated with the same routing code.

8. The method of claim 7, wherein said step of preventing comprises any of the steps of:

delaying delivery of a message from said second user pending confirmation of said mobile user's interest in receiving said message; and providing sufficient routing codes that recycling of codes is unlikely to be necessary.

9. A computer program product, said computer program product comprising a tangible medium with computer-readable code embodied thereon, said computer-readable code including code means for performing the steps of a method for facilitating instant messaging outside of a user-defined buddy group; the method comprising the steps of:

providing a plurality of reserved routing codes for exchanging instant messages with users not included in said user-defined buddy group;

exchanging instant messages between a user of a mobile unit device and a second user, said second user not included in said mobile user's buddy group;

assigning one of said routing codes to a message directed to said second user by said mobile unit user; and temporarily assigning one of said routing codes to said second user's personal identifier so that said mobile user can easily reply to said second user without originating a new message.

10. The computer program product of claim 9, wherein said step of exchanging instant messages comprises the steps of:

composing a message for said second user by said mobile user, said message including said second user's personal identifier in body of said message;

sending said message to a routing code assigned to an 'unlisted' function on said mobile device;

receiving said message at said instant messaging system;

capturing said second user's personal identifier by said instant messaging system;

assigning a routing code to said second user's personal identifier;

sending said message to said second user; and optionally returning notice of said assignment to said mobile user, so that future messaging is facilitated.

11. The computer program product of claim 9, wherein said step of exchanging instant messages comprises the steps of:

sending a message to said mobile user by said second user;

receiving said message at said instant messaging system;

capturing said second user's personal identifier by said instant messaging system;

assigning said a routing code to said second user's personal identifier; and sending said message to said mobile user.

12. The computer program product of claim 9, wherein said step of exchanging instant messages comprises the steps of:

receiving a message at said mobile unit from said second user, wherein said second user's personal identifier has previously been associated with a routing code; and replying to said received message by said mobile user by means of an automated 'reply' function on said mobile unit.

13. The computer program product of claim 9, wherein assignment of a routing code to said second user persists for the duration of a user session.

14. The computer program product of claim 9, wherein routing codes for assignment to a second user are recycled during a user session if the number of second users exceeds the available second routing codes.

15. The computer program product of claim 4, said method further comprising the step of:

preventing occurrence of a condition wherein different second users are associated with the same routing code.

16. The computer program product of claim 15, wherein said step of preventing comprises any of the steps of:

delaying delivery of a message from a second user pending confirmation of said mobile user's interest in receiving said message; and providing sufficient routing codes for assignment to said second user that recycling of codes is unlikely to be necessary.

17. An apparatus for facilitating instant messaging outside of a user-defined buddy group comprising:
- a plurality of reserved routing codes for exchanging instant messages with users not included in said user-defined buddy group;
- means for exchanging instant messages between a user of a mobile unit device and a second user, said second user not included in said mobile user's buddy group;
- means for assigning one of said routing codes to a message directed to said second user by said mobile unit user; and
- means for temporarily assigning one of said routing codes to said second user's personal identifier so that said mobile user can easily reply to said second user without originating a new message.

18. The apparatus of claim 17, wherein said means for exchanging instant messages comprises means for:
- composing a message for said second user by said mobile user, said message including said second user's personal identifier in body of said message;
- sending said message to a routing code assigned to an 'unlisted' function on said mobile device;
- receiving said message at said instant messaging system;
- capturing said second user's personal identifier by said instant messaging system;
- assigning a routing code to said second user's personal identifier;
- sending said message to said second user; and
- optionally returning notice of said assignment to said mobile user, so that future messaging is facilitated.

19. The apparatus of claim 17, wherein said means for exchanging instant messages comprises the means for:
- sending a message to said mobile user by said second user;
- receiving said message at said instant messaging system;
- capturing said second user's personal identifier by said instant messaging system;
- assigning a routing code to said second user's personal identifier; and
- sending said message to said mobile user.

20. The apparatus of claim 17, wherein said means for exchanging instant messages comprises means for:
- receiving a message at said mobile unit from said second user, wherein said second user's personal identifier has previously been associated with a routing code; and
- replying to said received message by said mobile user by means of an automated 'reply' function on said mobile unit.

21. The apparatus of claim 17, wherein assignment of a routing code to said second user persists for the duration of a user session.

22. The apparatus of claim 17, wherein routing codes for assignment to said second user are recycled during a user session if the number of second users exceeds the available second routing codes.

23. The apparatus of claim 22, further comprising means for:
- preventing occurrence of a condition wherein different second users are associated with the same routing code.

24. The apparatus of claim 23, wherein said means for preventing comprises means for any of:
- delaying delivery of a message from a second user pending confirmation of said mobile user's interest in receiving said message; and
- providing sufficient routing codes for assignment to said second users that recycling of codes is unlikely to be necessary.

* * * * *